(12) United States Patent
Cohen et al.

(10) Patent No.: US 8,862,654 B1
(45) Date of Patent: Oct. 14, 2014

(54) SYNDICATED ELECTRONIC MEDIA DISTRIBUTION

(75) Inventors: Gabriel Cohen, San Mateo, CA (US);
Nick Dower, San Francisco, CA (US);
John Harding, San Francisco, CA (US)

(73) Assignee: Google Inc., Mountain View, CA (US)

( * ) Notice: Subject to any disclaimer, the term of this patent is extended or adjusted under 35 U.S.C. 154(b) by 1487 days.

(21) Appl. No.: 12/029,294

(22) Filed: Feb. 11, 2008

(51) Int. Cl.
*G06F 15/16* (2006.01)

(52) U.S. Cl.
USPC ............................................ 709/200; 709/203

(58) Field of Classification Search
USPC ......................................... 709/200, 203, 217
See application file for complete search history.

(56) References Cited

U.S. PATENT DOCUMENTS

| | | | | |
|---|---|---|---|---|
| 7,490,135 | B2* | 2/2009 | Klug et al. .................... | 709/217 |
| 2002/0033844 | A1* | 3/2002 | Levy et al. .................... | 345/744 |
| 2008/0168154 | A1* | 7/2008 | Skyrm et al. .................. | 709/218 |
| 2009/0037967 | A1* | 2/2009 | Barkan et al. ................. | 725/105 |
| 2009/0144392 | A1* | 6/2009 | Wang et al. ................... | 709/217 |
| 2010/0011425 | A1* | 1/2010 | Eyal ................................. | 726/5 |
| 2010/0017859 | A1* | 1/2010 | Kelly et al. ....................... | 726/5 |
| 2010/0299734 | A1* | 11/2010 | Lynch et al. ..................... | 726/6 |

OTHER PUBLICATIONS

VideoEgg, Inc., "About Us—VideoEgg," Downloaded from http://www.videoegg.com/about/; dated Aug. 26, 2007; 2 pages.
Wikipedia, "Orkut," Downloaded from http://en.wikipedia.org/wiki/Orkut; dated Feb. 9, 2008; 6 pages.
Wikipedia, "Betio," Downloaded from http://en.wikipedia.org/wiki/Bebo; dated Feb. 10, 2008; 4 pages.
Wikipedia, "Brightcove," Downloaded from http://en.wikipedia.org/wiki/Brightcove; dated Dec. 12, 2007; 4 pages.

* cited by examiner

*Primary Examiner* — Joshua Joo
(74) *Attorney, Agent, or Firm* — Amin, Turocy & Watson, LLP

(57) ABSTRACT

Methods and systems for syndicating media with distributed content rights. A system whereby an alternate website can enable media services for their audience by allowing content submitters to directly contribute media files for distribution to a web based media provider while maintaining member rights and member managed distribution channels is presented. In addition, by the use of metadata the media files can be easily referenced, included, and searched on by the alternate website. A method for syndicating media with distributed content rights is also presented.

16 Claims, 5 Drawing Sheets

SYNDICATED ELECTRONIC MEDIA DISTRIBUTION

BACKGROUND

1. Field of the Invention

The present invention relates to electronic media distribution.

2. Related Art

Electronic media distribution, especially the sharing of video files, may involve websites or software where a user can post and distribute his or her own music and video files. While many media distribution websites place restrictions on the file size, duration, subject matter and format of the uploaded video file, the sites do not generally have sophisticated control systems which allows the media file submitter to control the sharing or distribution of the material.

The popularity of media posting and sharing has increased dramatically in recent years, compounding the problem of controlling posted material. As an example, a current popular media distribution website service allows unregistered users to access most any posted video while registered users are permitted to upload an unlimited number of videos. In July 2006 a popular media distribution website revealed that more than 100 million videos were being watched every day, and 2.5 billion videos were watched during the month of June 2006. The website estimated that over 50,000 videos were being added per day in 2006 and that over 6.1 million videos and 50,000 user accounts were active in 2006. Furthermore, the website noted that the number of posted videos increased to over 60 million in less than twelve months during 2007.

What are needed, therefore, are systems and/or methods to alleviate the aforementioned deficiencies. Particularly, what is needed is an effective approach to maintain a media file submitter's rights while allowing the submitter to manage the distribution of one's media files.

BRIEF SUMMARY

Consistent with the principles of the present invention as embodied and broadly described herein, embodiments of the present invention include a media syndication system including a media control system and a provider hosting system. The media syndication system operates using a system of software tokens whereby a submitter of a media file posted on an alternate website may request that the media file be uploaded to a media provider website. The media control system, which can be controlled by the media provider, authorizes the alternate website to upload the submitter's media file only after the submitter identifies media file details and authorizes the upload. The media control system verifies the receipt of the media file by the media provider website and assigns a unique identifier to the media file. The provider hosting system controls and stores the media file within a media content database.

In another embodiment, a submitter of a media file not yet posted to an alternate website may interact with the alternate website wherein the media submitter's request to upload a media file to the alternate website is redirected, such that the media file is uploaded via the media control system to the media provider website. In this embodiment the alternate website is not required to directly provide media hosting services with the associated bandwidth required to effectively host media files.

In another embodiment, a method for receiving media content at a media provider starts by authenticating a media content submitter's identity. The method continues by receiving a communication from an alternate website containing the identity of the media content submitter, transmitting to the alternate website identification data and identification information of the media content that the submitter is requesting to transfer from the alternate website to the media provider. It continues by authorizing the transfer of the media content from the alternate website to the media provider, authorizing the submitter to initiate the transfer, verifying a request to transfer the media content utilizing software tokens, and receiving the media file from the alternate website. The method concludes by assigning a unique identifier to the received media file.

In another embodiment, a method for transferring media content to a media provider involves posting of a media file to an alternate website by a submitter, registration of the submitter on the media provider's website, deciding that the media file should be transferred from the alternate website to a media provider by the submitter, and initiating the transfer of the media file from the alternate website to the media provide by the submitter.

In another embodiment, a method for transferring media content to a media provider involves allowing a submitter to post a media file to an alternate website, acknowledging a submitter's request to transfer a media file from the alternate website to the media provider, sending the media submitter's identity to the media provider from the alternate website, receiving a software token sent from a media provider by the alternate website where the token contains the alternate website's identification information and details of the media file that the submitter is attempting to transfer, and transferring the media file to the media provider from the alternate website.

In this way a media file submitter may control their rights while also managing the distribution of media files. In addition, as the distribution request utilizes a series of software tokens to verify identification of the submitter, media files, and alternate website, and confirmation of the intent of the media submitter to transfer the media file, the process is managed in a secure manner.

Further embodiments, features, and advantages of the invention, as well as the structure and operation of the various embodiments of the invention are described in detail below with reference to accompanying drawings.

BRIEF DESCRIPTION OF THE FIGURES

The accompanying drawings, which are incorporated in and constitute part of the specification, illustrate embodiments of the invention and, together with the general description given above and the detailed description of the embodiment given below, serve to explain the principles of the present invention. In the drawings.

DETAILED DESCRIPTION

The present invention relates to the syndication of media files. In embodiments of this invention, the media file submitter retains control and distribution by a system of authorizing software tokens which verify identification information and the distribution approval process.

While specific configurations, arrangements, and steps are discussed, it should be understood that this is done for illustrative purposes only. A person skilled in the pertinent art(s) will recognize that other configurations, arrangements, and steps may be used without departing from the spirit and scope of the present invention. It will be apparent to a person skilled in the pertinent art(s) that this invention may also be employed in a variety of other applications.

It is noted that references in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to incorporate such a feature, structure, or characteristic in connection with other embodiments whether or not explicitly described.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1:
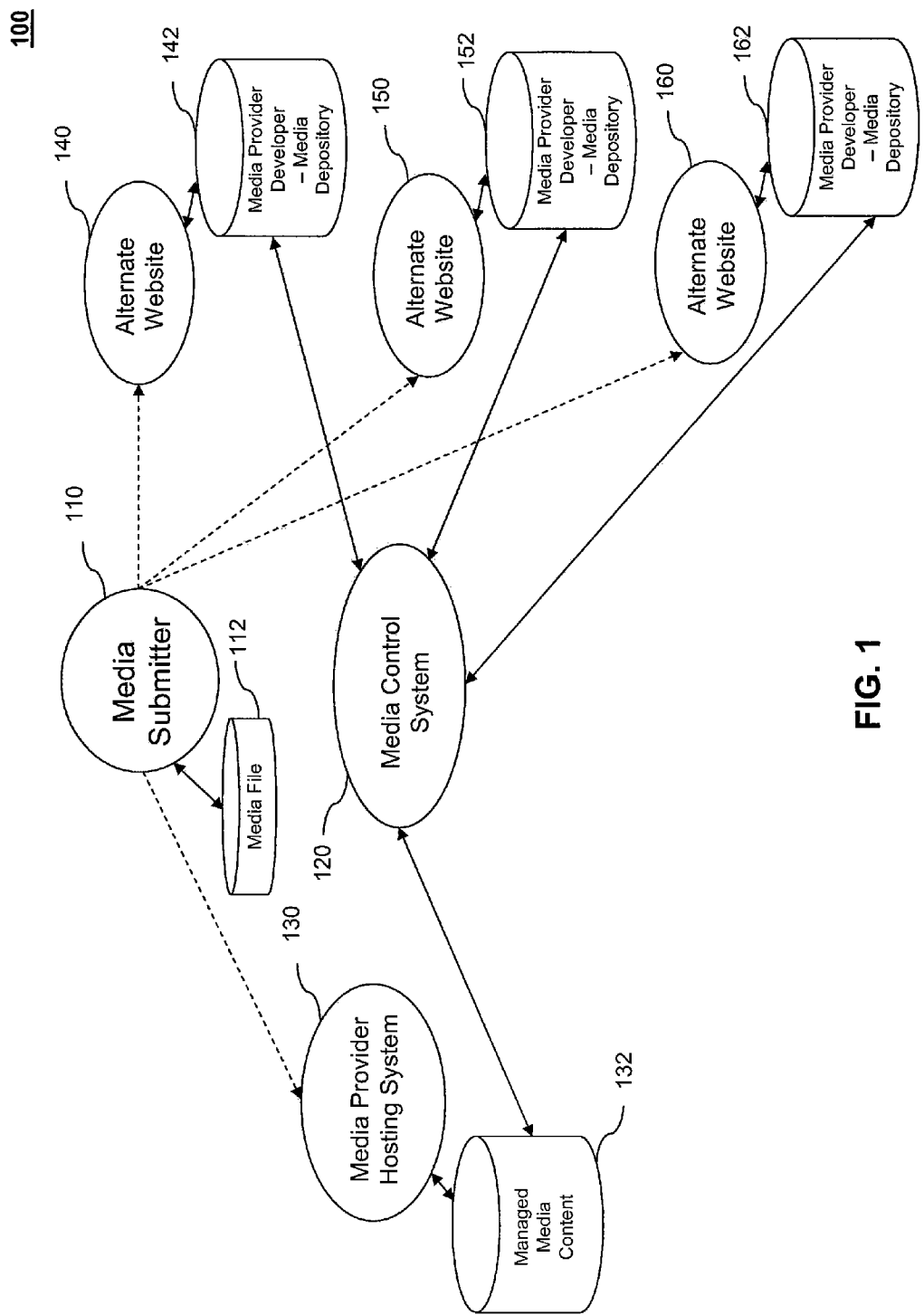
FIG. 1 is a system diagram depicting an implementation of a system for syndicating media with distributed content rights, according to an embodiment of the invention.

FIG. 1 is an illustration of a system 100 for managing the syndication of a media file 112 under the control of a media submitter 110, according to an embodiment of the invention. The term "file" as used herein refers to a group of data, including but not limited to audio and video files created using standard encoders, such as MPEG, Flash, etc. System 100 contains two primary components, a media control system 120 and a media provider hosting system 130. In an embodiment the media submitter 110 would post media file 112 on one or more alternate websites such as 140, 150, and 160. The media file would then be stored by each of the receiving alternate websites on each respective alternate website's media depository system, illustrated as depositories 142, 152, and 162.

However, the media submitter 110, at some point in time, may decide to post a copy of the media file 112 that resides on one or more of the alternate websites, to a media provider hosting system 130. Rather than having the media submitter 110 upload the media file 112 to the media provider hosting system 130, the media submitter 110 may request that one or more of the alternate websites 140, 150, and/or 160 that already has received a copy of media submitter's media file 112, be the entity that is responsible for transferring a copy of the media file 112. The media file 112 would be transferred from the alternate website media depository system 142, 152, and 162 to the media provider hosting system 130 and subsequently to the provider hosting system's own managed media content system 132 under the administration of the media control system 120. The managed media system 132 may be some type of database. As referred to herein, a database can be a table, list, or any other collection or organization of information known to one of skill in the art, whether represented, for example, as a flat file or a set of relational tables, lists, or records.

In FIG. 1, the media control system 120 administers the process by which the media submitter's media file 112 is uploaded from an alternate website to the provider hosting system's managed media content database 132. In this embodiment the media file resides at the alternate website and is then uploaded to the media provider. In other embodiments described below, the media file is uploaded by the media submitter to the media provider and does not reside at an alternate website. To ensure security, identification information concerning the media file 112 and the media submitter 110, is embedded within the transferred media file 112 by the use of metadata. The media control system 120 uses a series of software tokens to verify the identity of the media submitter 110 that is requesting the transfer of a media file, as well as the identity of the transferring alternate website to ensure the that both the media submitter 110 and alternate website 140 are who they say they are. Software tokens, as used here and elsewhere in the system and method of the invention, are blocks of data that are used to authenticate a sending party to a receiving party, and/or to verify that some event has taken place. Data contained in the token may include, for example, an identifier of the sender. In an embodiment of the invention, this data is encrypted using a key that is privately held by the sender. This encryption represents a signature, in that only the holder of the key can perform this encryption. The receiving party can then decrypt the token to verify that the sender is who he claims to be, and that the communication is legitimate.

In this manner, after the media submitter 110 requests the transfer of a media file 110, and the media control system 120 verifies the identity of the media submitter 110 and the alternate website 140, then the media control system 120 authorizes the media submitter 110 to initiate the transfer. Once the transfer of the media file 112 to the provider hosting system's managed media content database 132 is completed, the media control system 120 assigns the transferred media file 112 a unique identifier.

An alternate website 140, 150, and/or 160 also has the ability to search the managed media content 132 of the media provider. As an example, such a search may be accomplished through the use of an API on the media provider hosting system 130. As another example, the media provider hosting system providing could provide direct access of the managed media content 132 to an alternate website 140.

An alternate website 140 would be able to search the managed media content 132 by one or more of a variety of criteria including a uniquely assigned alternate website identifier, a media submitter's identification, a media file's title, a media file's description, and a media file's assigned category. An alternate website 140 would also have the option to define and encode multiple customized data fields associated with a media file and then have the option to search by those customized fields.

In another embodiment a media submitter 110 would interact with one or more alternate websites such as 140, 150, and 160, wherein the media submitter would be prompted by the alternate website 140 to upload a media file 112. However, in this embodiment the media file 112 is not uploaded to the alternate website 140.

In this embodiment the alternate website does not host the media file 112 but instead redirects the uploading of the media file 112 to the media provider hosting system 130 and subsequently to the provider hosting system's managed media content system 132 under the administration of the media control system 120. In this manner, as an example, the alternate website 140 can offer and promote the uploading and syndication of media files but does not have to directly control and administer the process and resources necessary to host and share such media files.

In another embodiment a media submitter 110 would interact with one or more alternate websites such as 140, 150, and 160, wherein the media submitter would be prompted by the alternate website 140 to upload a media file 112. In this embodiment, as in the prior embodiment, the media file 112 is not uploaded to the alternate website 140. The media file 112 is uploaded to the media provider; the file 112 is not being transferred to the alternate website 140 before being resent to the media provider hosting system 130.

However, in this embodiment the media submitter 110 would be redirected to the media provider's hosting system 130 whereby the media submitter 110 would be under the control of the media control system 120. In this manner, as an example, the alternate website 140 can promote the uploading and syndication of media files by redirecting users to the media provider's website.

Figure 2:
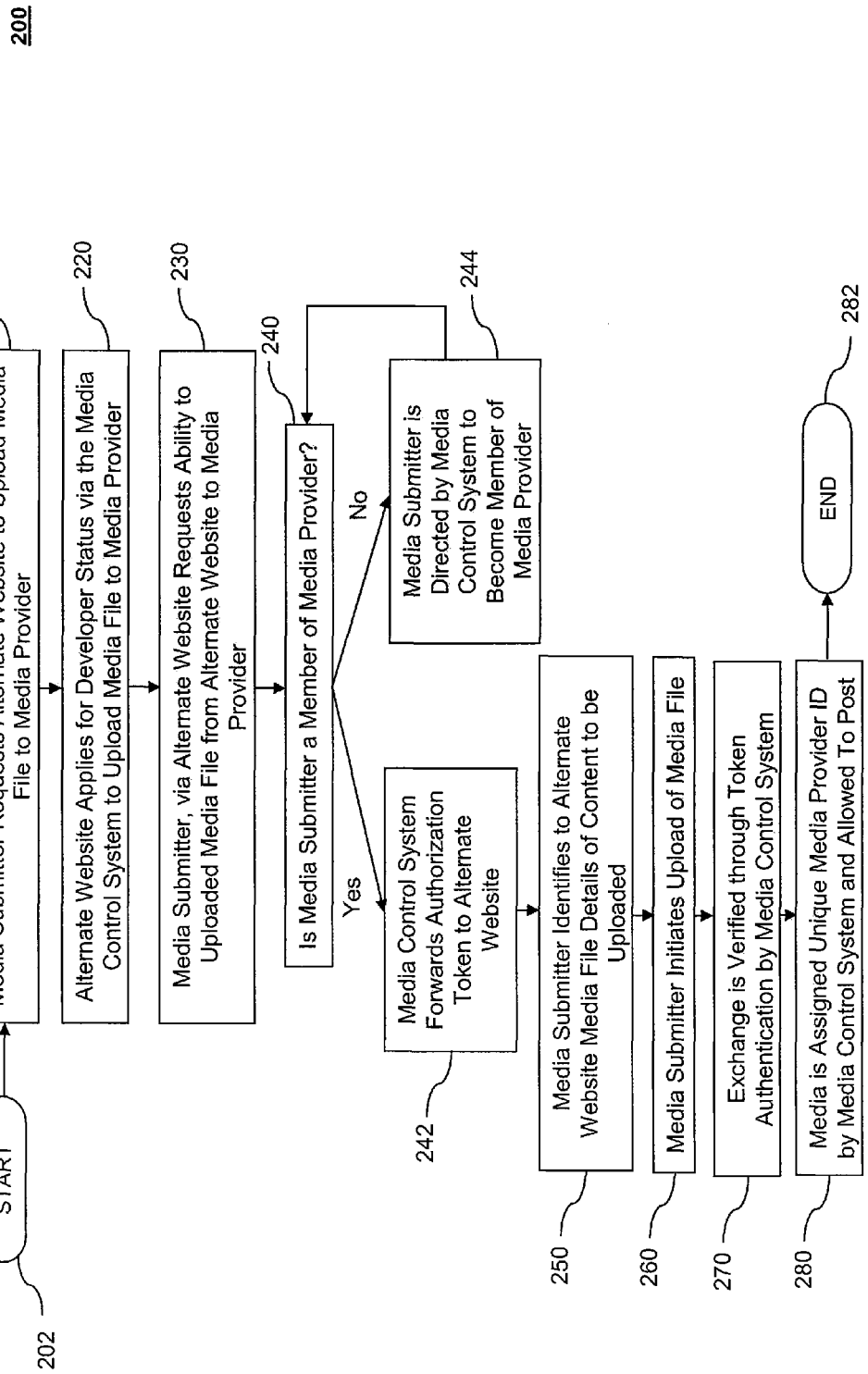
FIG. 2 is a flowchart depicting an implementation of a system for syndicating media with distributed content rights where a media submitter's media file resides on an alternate website, according to an embodiment of the invention.

FIG. 2 is a flowchart illustrating a process 200 in which a media submitter initiates and executes an authorized copying and posting of a media file from an alternate website to a media provider hosting system 130, according to an embodiment of the invention. The process starts at step 202. In step 210 a media submitter submits a request to an alternate website to upload a particular media file to a media provider. However, the media provider, via the media control system 120, must recognize the alternate website and as such requires that the alternate website, in step 220, apply to the media control system for developer status. This step allows the media provider to qualify and otherwise evaluate an alternate website according to criteria developed by the media provider as to whether the media provider will accept requests to upload media files from the alternate website. The process of granting an alternate website developer status is not automatic, but is under the discretion of the media provider.

Once the alternate website is approved and granted developer status then the media submitter in step 230 may request that the alternate website upload a media file to the media provider. However, just as the alternate website must be recognized and registered with the media provider, so too must the media submitter. Thus, in step 240 the media submitter is queried by the media provider as to whether the media submitter is a member of the media provider website. If the media submitter is not a member then the media submitter in step 244 is directed to the media control system in order to become a member of the media provider website and services before being allowed to request a transfer of any media files. Once the media submitter is a member of the media provider website and services, the media submitter's identity is verified by the media provider through the acceptance of a software token, where the software token is provided by the media submitter directly to the media provider. Once a media submitter's membership is verified, in step 242 the media control system forwards a software authorization token to the alternate website from which the media submitter has requested the media file be transferred. This authorization token identifies the alternate website and the media submitter as being authorized to transfer media files to the media provider. Communications, including those with a media submitter, media control system, alternate website, and media provider may be performed using an encrypted or signed protocol for increased security. In embodiments of the invention, the alternate website would need to generate, or otherwise obtain, appropriate software in order to implement these steps.

In step 250 the media submitter then selects the media file to upload to the media provider by identifying media file content details to the alternate website. These details are of such specificity that the alternate website can identify the requested media file. Once the desired media file is identified, in step 260 the media submitter initiates the transfer of the media file from the alternate website to the media provider using additional logic, such as an API module given by the media provider, wherein the media submitter would interact to provide the required information concerning the identification of the media file and the desired media provider. Receipt of the media file is verified in step 270 through a token authentication process between the alternate website and the media control system. The media file is then assigned a unique identifier by the media control system in step 280 and allowed to be posted to the media provider website. The flowchart concludes with step 282.

Figure 3:
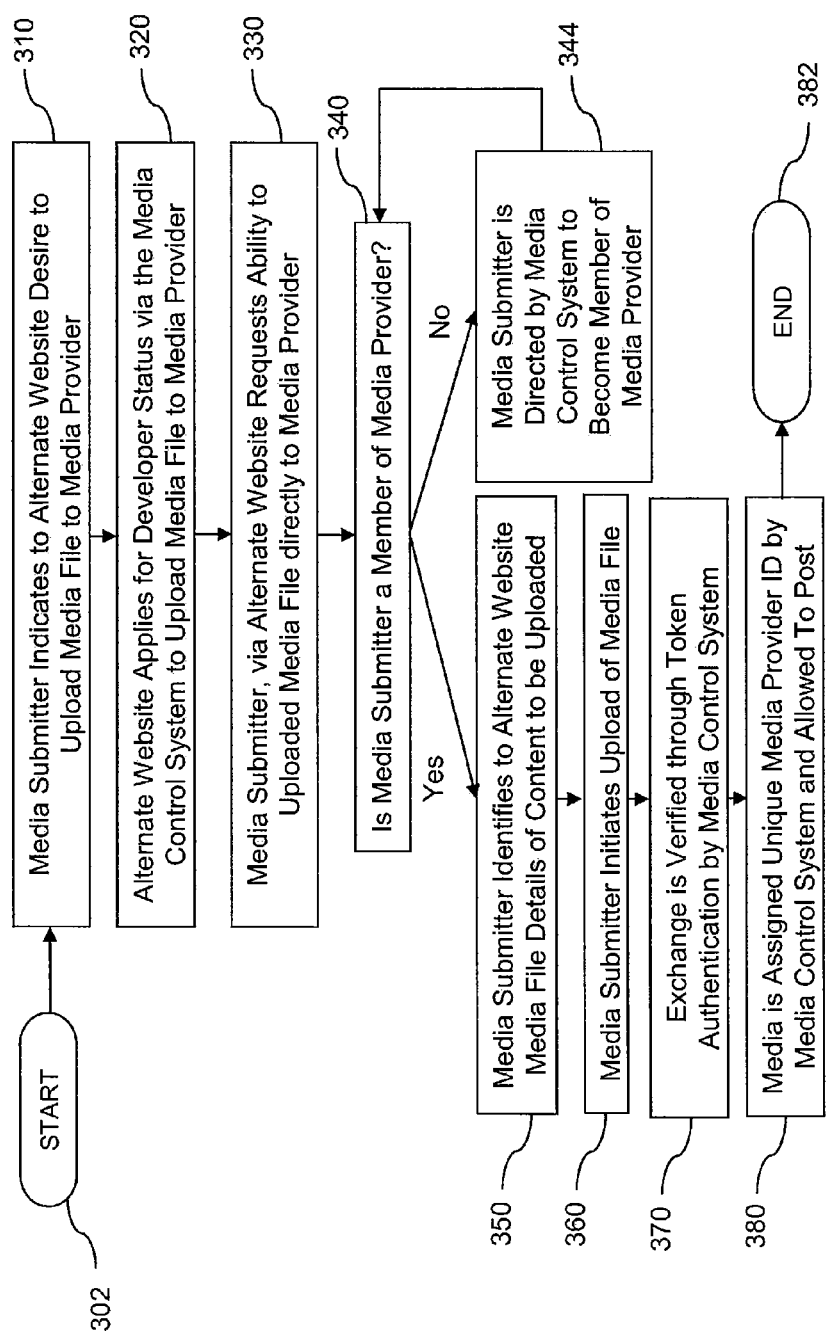
FIG. 3 is a flowchart depicting an implementation of a system for syndicating media with distributed content rights where a media submitter's media file does not reside on an alternate website, according to an embodiment of the invention.

FIG. 3 is a flowchart illustrating a process 300 in which a media submitter initiates and executes an authorized copying and posting of a media file from the media submitter to a media provider hosting system 130, according to an embodiment of the invention. The process starts at step 302. In step 310 a media submitter indicates to an alternate website that the media submitter desires to upload a particular media file to a media provider. However, the media provider, via the media control system 120, must recognize the alternate website and as such requires that the alternate website, in step 320, apply to the media control system for developer status. This step allows the media provider to qualify and otherwise evaluate an alternate website according to criteria developed by the media provider as to whether the media provider will accept requests to redirect the uploading of a media submitter's media files directly to the media provider. The process of granting an alternate website developer status is not automatic, but is under the discretion of the media provider.

Once the alternate website is approved and granted developer status then the media submitter in step 330 may request that the media submitter's media file be uploaded to the media provider. However, just as the alternate website must be recognized and registered with the media provider, so too must the media submitter. Thus, in step 340 the media submitter is queried by the media provider as to whether the media submitter is a member of the media provider website. If the media submitter is not a member then the media submitter in step 344 is directed to the media control system in order to become a member of the media provider website and services before being allowed to upload any media files. Once the media submitter is a member of the media provider website and services, the media submitter's identity is verified by the media provider through the acceptance of a software token, where the software token is provided by the media submitter directly to the media provider. Communications, including those with a media submitter, media control system, alternate website, and media provider may be performed using an encrypted or signed protocol for increased security. In embodiments of the invention, the alternate website would need to generate, or otherwise obtain, appropriate software in order to implement these steps.

In step 350 the media submitter then selects the media file to upload to the media provider by identifying media file content details to the alternate website. These details are of such specificity that the alternate website can identify the requested media file. Once the desired media file is identified, in step 360 the media submitter initiates the transfer of the media file from the media submitter to the media provider using additional logic, such as an API module given by the media provider, wherein the media submitter would interact to provide the required information concerning the identification of the media file and the desired media provider. Receipt of the media file is verified in step 370 through a token authentication process between the alternate website and the media control system. The media file is then assigned a unique identifier by the media control system in step 380 and allowed to be posted to the media provider website. The flowchart concludes with step 382.

Figure 4:
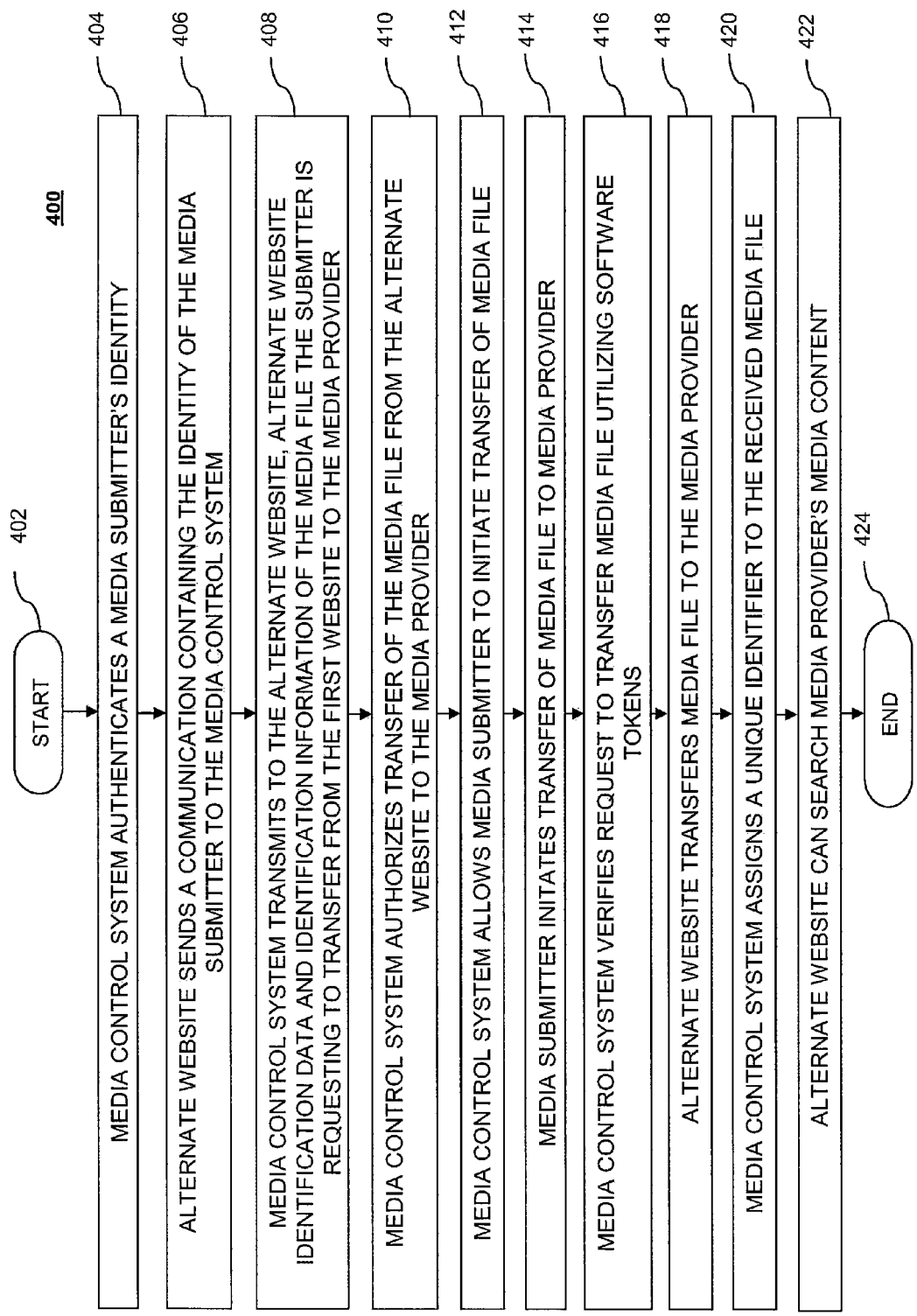
FIG. 4 is a flowchart depicting a method for syndicating media with distributed content rights where a media submitter's media file resides on an alternate website, according to an embodiment of the invention.

FIG. 4 is a flowchart depicting a method 400 for the syndication of owned media files, wherein a media submitter's media file resides on an alternate website, according to an embodiment of the present invention. Method 400 begins at step 402. In step 404, a media submitter's identity is authenticated by the media control system, establishing that the media provider control system recognizes the media submitter as an authorized user of the media provider's services. In step 406 the media submitter, who is using the services of an alternate website where the media submitter has a media file posted, is requesting that the file be transferred to the media provider. Step 406 represents the alternate website's action to communicate to the media control system the identity of the media submitter and identification of the media file. In step 408 the media control system responds to the alternate website with identification information regarding the alternate website and identification information concerning the requested media file. In step 410 the media control system authorizes the transfer of the media file from the alternate website to the media provider. However, the media control system, in step 412, waits for the media submitter to initiate the transfer of the media file before the media control system will accept the media file from the alternate website. This is accomplished in step 414 when the media submitter authorizes the transfer of the media file. In step 416 the media control system verifies that the request to transfer the file is valid by the use of software tokens. Once verified, in step 418 the alternate website will transfer the media file to the media provider. When the media file is received, in step 420 the media control system assigns a unique identifier to the received media file. In step 422, once the media file is received and given the unique identifier number, then the alternate website has the ability to search the media provider's media content by various characteristics, including the media submitter's identity, the alternate website's identity, and media file attributes. Method 400 ends at step 424.

Figure 5:
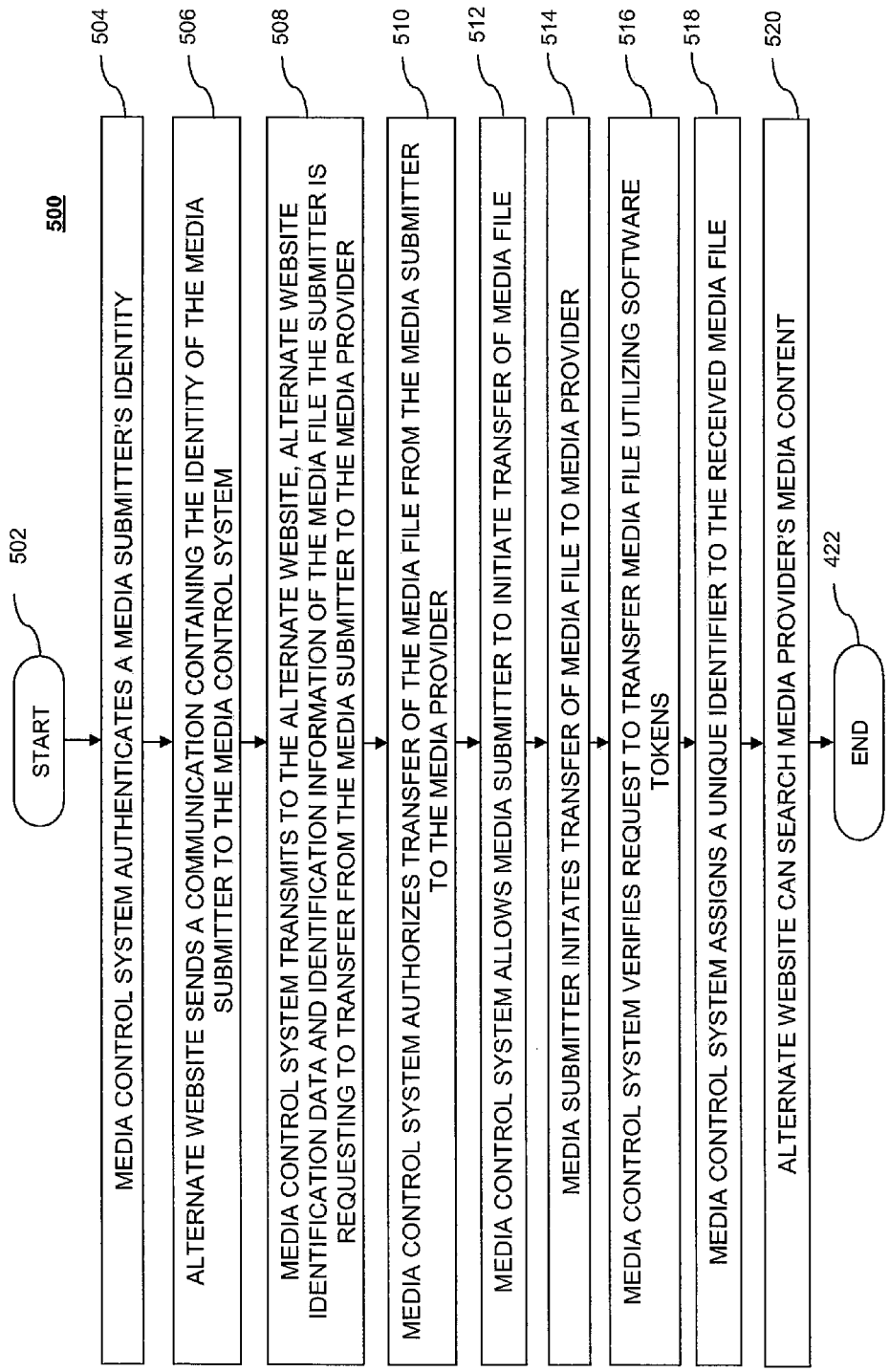
FIG. 5 is a flowchart depicting a method for syndicating media with distributed content rights where a media submitter's media file does not reside on an alternate website, according to an embodiment of the invention.

FIG. 5 is a flowchart depicting a method 500 for the syndication of owned media files wherein a media submitter's media file does not reside on an alternate website, according to an embodiment of the present invention. Method 500 begins at step 502. In step 504, a media submitter's identity is authenticated by the media control system, establishing that the media provider control system recognizes the media submitter as an authorized user of the media provider's services. In step 506 the media submitter, who is using the services of an alternate website, is requesting that a media file of the media submitter be transferred to the media provider. Step 506 represents the alternate website's action to communicate to the media control system the identity of the media submitter and identification of the media file. In step 508 the media control system responds to the alternate website with identification information regarding the alternate website and identification information concerning the media file. In step 510 the media control system authorizes the transfer of the media file from the media submitter to the media provider. However, the media control system, in step 512, waits for the media submitter to initiate the transfer of the media file before the media control system will accept the media file from the media submitter. This is accomplished in step 514 when the media submitter authorizes the transfer of the media file. In step 516 the media control system verifies that the request to transfer the file is valid by the use of software tokens. When the media file is received, in step 518 the media control system assigns a unique identifier to the received media file. In step 520, once the media file is received and given the unique identifier number, then the alternate website has the ability to search the media provider's media content by various characteristics, including the media submitter's identity, the alternate website's identity, and media file attributes. Method 500 ends at step 522.

The processes of FIGS. 2, 3, 4, and 5 can be implemented in software, firmware, or hardware, or using any combination thereof. If programmable logic is used, such logic can execute on a commercially available processing platform or a special purpose device.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A system, comprising:
   a media control system that administers an upload process of a media file to a media provider website utilizing an alternate website; and
   a hosting system that controls the media provider website and associated managed media content, wherein media file submitter information, media file identification information and metadata are embedded within the media file, and wherein the media control system transmits a software token comprising information identifying alternate website identification and a submitter of the media file as being authorized to transfer the media file, and comprising details of the media file.

2. The system of claim 1, wherein the media file is transferred to the alternate website before being uploaded to the media provider website.

3. The system of claim 1, wherein the media file is stored on a first device associated with the submitter before being uploaded to the media provider website and is not stored at a second device for the alternate website.

4. The system of claim 1, wherein the media file submitter information is communicated to the media control system from the alternate website using the software token.

5. The system of claim 1, wherein the media control system also authorizes an upload of the media file from the alternate website to the media provider website.

6. The system of claim 1, wherein a device associated with the submitter initiates a transfer of the media file from the alternate website to the media provider website.

7. The system of claim 1, wherein the media control system also authorizes an upload of the media file from the device associated with the submitter to the media provider website.

8. The system of claim 1, wherein the media control system also assigns a unique identifier to the media file after upload of the media file.

9. The system of claim 1, wherein the alternate website also searches the managed media content of the media provider for media content based on criteria comprising at least one of a website identification credential, a media file submitter identification credential or a description of the media file.

10. A method, comprising:
authenticating, by an media provider website device, an identity of a submitter of media;
authenticating, by the media provider website device, an identity of an alternate website that provides the media;
receiving a communication from the alternate website, wherein the communication comprises information indicative of the identity of the submitter; and
transmitting, by the media provider website device, to the alternate website, an electronic token comprising alternate website identification data and information about the media file.

11. The method of claim 10, wherein the media file is searched by the alternate website for media content based on criteria comprising at least one of a website credential, a credential of the submitter or a description of the media file.

12. A method, comprising:
receiving, by an alternate website device comprising a processor, a request to transfer a media file to a media provider device;
transmitting an identity of a submitter of the media file to the media provider device; and
receiving, from the media provide device, a software token comprising information identifying alternate website identification and the submitter as being authorized to transfer the media file, and comprising details of the media file.

13. The method of claim 12, further comprising searching the media file for media content based on criteria comprising at least one of a website credential, a credential for the submitter or content.

14. A non-transitory computer-readable storage medium storing executable instructions that, when executed on a processor, cause the processor to perform operations comprising:
receiving a request to transfer a media file to a media provider device;
transmitting, to the media provider device, information indicative of a submitter of the media file; and
receiving an electronic token comprising information identifying alternate website identification and information indicative of the submitter as being authorized to transfer the media file, and comprising details of the media file.

15. The non-transitory computer-readable storage medium of claim 14, wherein the media file is searchable by a website based on criteria comprising at least one of a website credential, a credential for the submitter, or a media description.

16. A non-transitory computer-readable storage medium storing executable instructions that, when executed on a processor of a media provider website device, cause the processor to perform operations comprising:
authenticating an identity of a submitter of media;
authenticating an identity of an alternate website that provides the media;
receiving a communication from the alternate website, wherein the communication comprises information indicative of the identity of the submitter; and
transmitting, to the alternate website, an electronic token comprising alternate website identification data and information about the media file.

\* \* \* \* \*